Jan. 30, 1945. W. O. HANCOCK 2,368,136
CULTIVATOR ATTACHMENT
Filed Jan. 27, 1944 3 Sheets-Sheet 1
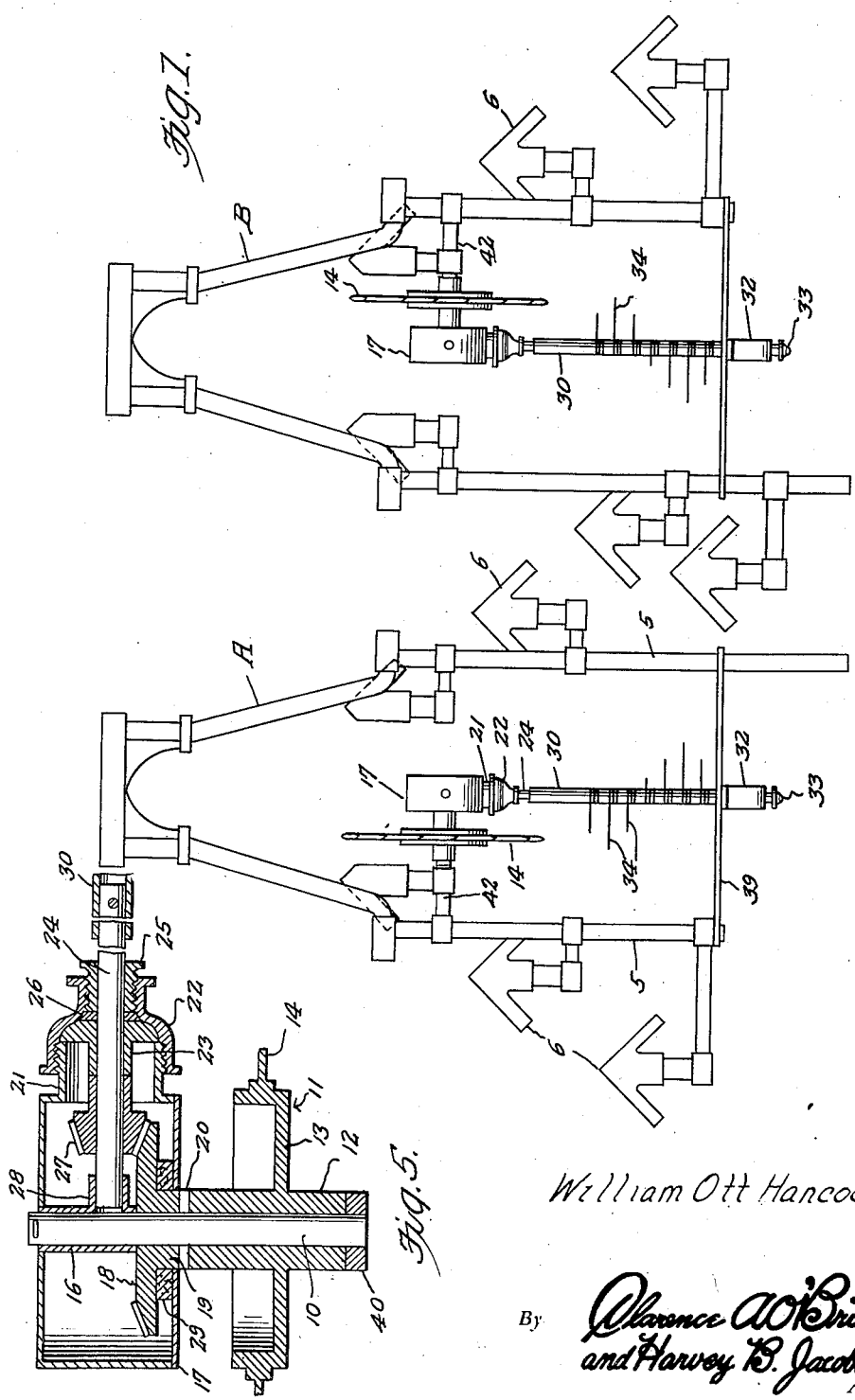
Inventor
William Ott Hancock

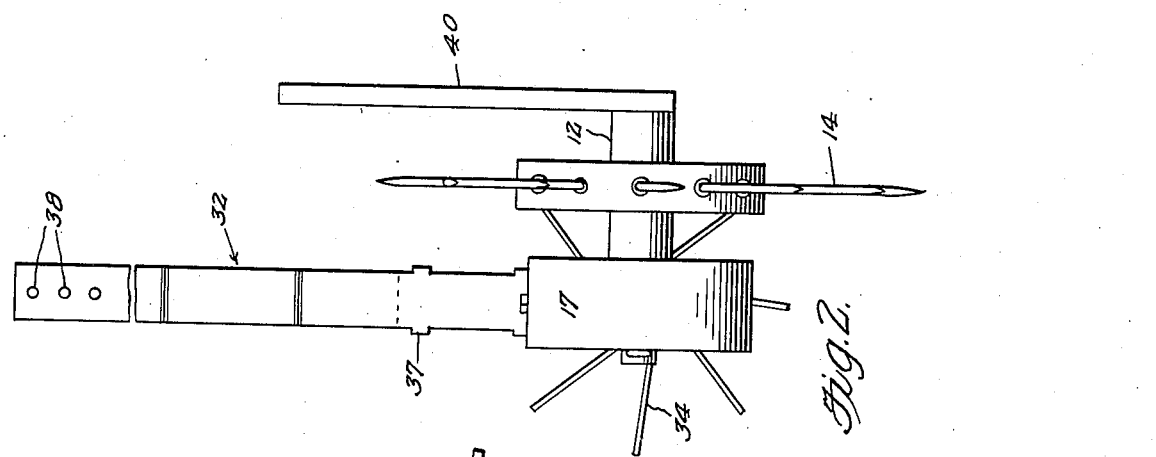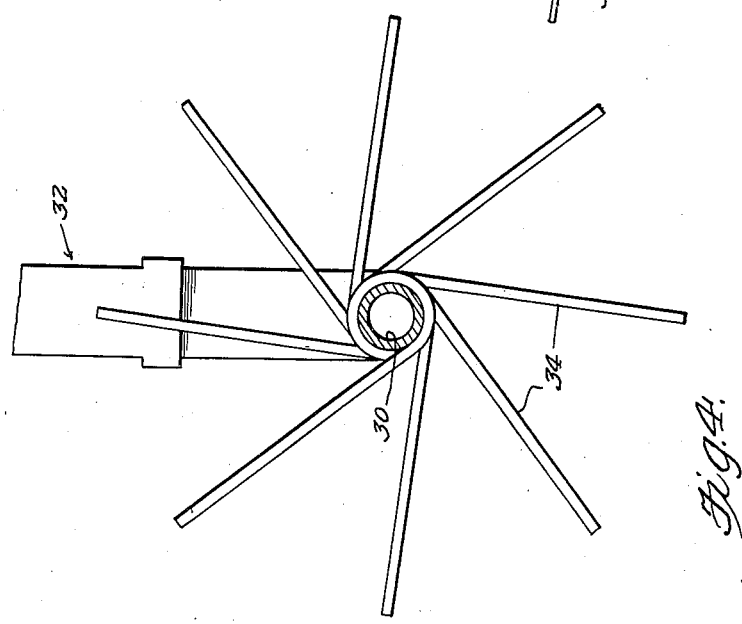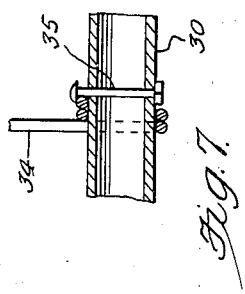

Jan. 30, 1945.  W. O. HANCOCK  2,368,136
CULTIVATOR ATTACHMENT
Filed Jan. 27, 1944  3 Sheets-Sheet 3
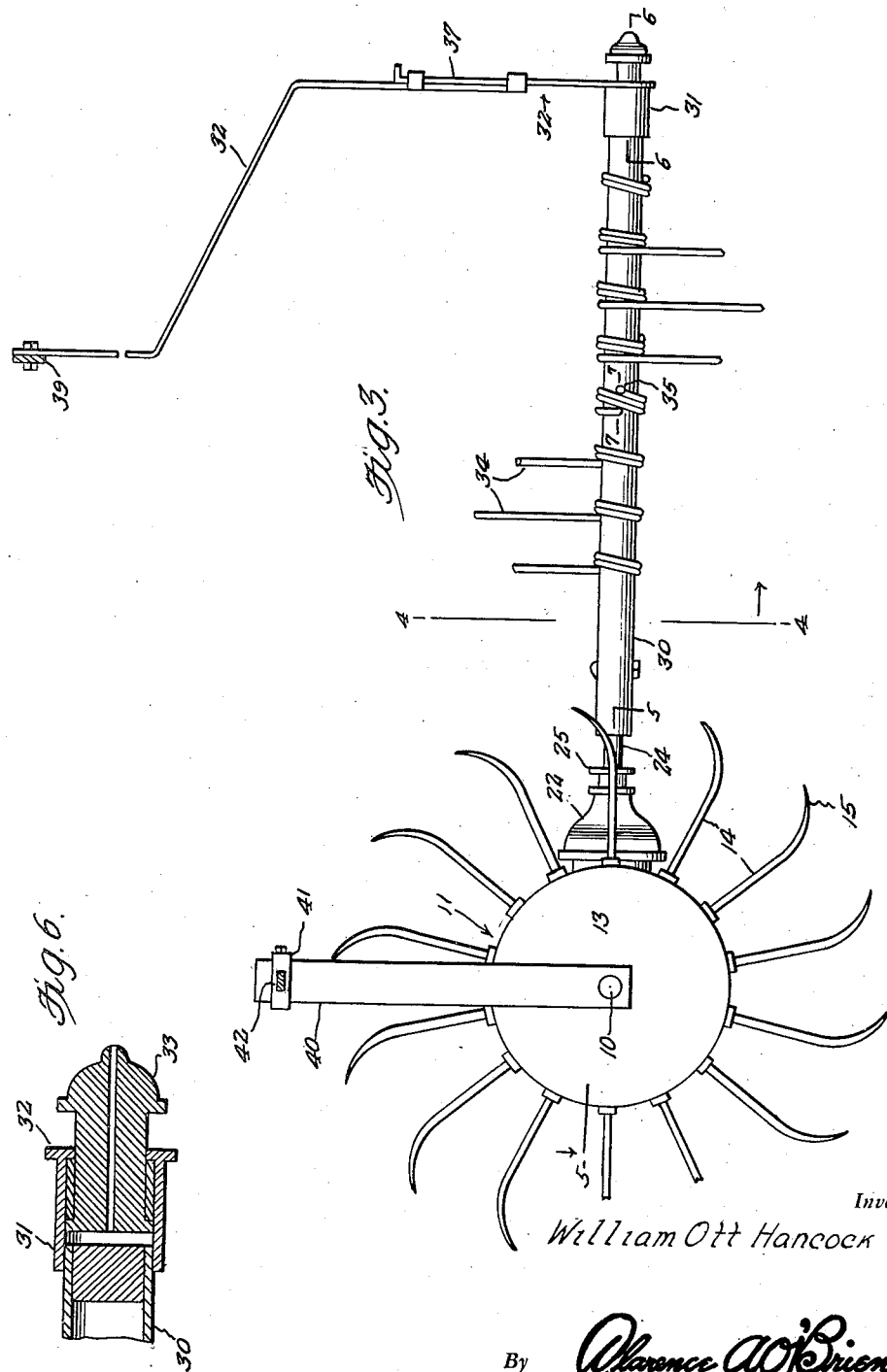
Inventor
William Ott Hancock
By Clarence A. O'Brien
and Harvey B. Jacobson
Attorneys Patented Jan. 30, 1945

2,368,136

UNITED STATES PATENT OFFICE 2,368,136

CULTIVATOR ATTACHMENT

William Ott Hancock, Knoxville, Iowa

Application January 27, 1944, Serial No. 519,919

2 Claims. (Cl. 97—35)

This invention relates to an attachment for straddle row cultivators, and has more particular reference to an attachment of this kind having means for effectively stirring the soil around the plants to be cultivated, for removing clods of dirt from around the plants, and for removing excess dirt from the plants that have been covered up in cultivation.

The primary object of the present invention is to provide an attachment of the above kind which is comparatively simple in construction, efficient in operation, and readily applicable to standard cultivators.

The invention embodies a rotatable shaft disposed longitudinally of the cultivator unit so as to be disposed directly above the row of plants being cultivated, said shaft having a longitudinal series of spaced tangentially arranged spring teeth disposed in spiral or auger fashion about the shaft, means being provided to rotatably drive the shaft so that the spring teeth pass between the plants in a row for stirring the soil, and removing clods and excess dirt from the plants.

A further object of the invention is to provide means whereby the attachment may be vertically adjusted relative to the cultivator unit so that the spring teeth or fingers will most effectively operate between the plants.

A further object of the invention is to provide simple and efficient driving means for the spring teeth carrying shaft, including a toothed ground-engaging wheel geared to the forward end of the spring teeth carrying shaft.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a top plan view showing attachments constructed in accordance with the present invention and applied to the cultivator units of a two-row, straddle-row type of cultivator.

Figure 2 is a front elevational view of the attachment per se.

Figure 3 is a side elevational view thereof.

Figure 5 is a transverse section taken on line 4—4 of Figure 3.

Figure 5 is a horizontal fragmentary longitudinal section taken on line 5—5 of Figure 3.

Figure 6 is an enlarged fragmentary section taken on line 6—6 of Fig. 3.

Figure 7 is a fragmentary longitudinal section taken on line 7—7 of Figure 3 to show the manner of attaching the spring teeth or fingers to the longitudinal shaft of the attachment.

Referring in detail to the drawings, Figure 1 shows two cultivator units A and B of a two-row cultivator of the straddle-row type. Each cultivator unit includes a pair of beams 5, each carrying a gang of cultivating shovels or plows 6, one at each side of the row to be cultivated. The present attachment is to be supported by and between the beams 5 of each cultivator unit, as clearly shown in said Figure 1. Of course, while the device has been shown in connection with each cultivator unit of a two-row cultivator, it can of course be associated with the cultivator unit of a single-row cultivator, as will be apparent.

Each attachment includes a transverse axle 10 having a spiked driving wheel 11 journaled on one end portion thereof, said wheel including a hub 12 provided with a disc body 13 having spikes 14 radiating therefrom at regular or uniform intervals, the outer ends of the spikes being pointed and curved circumferentially of the wheel, as at 15. The other end of axle 10 is fixed within a tube 16 provided centrally of a gear casing 17, and journaled on the axle 10 at the inner side of tube 16 is a bevel gear having a hub 19 projecting through the inner side of gear casing 17. The adjacent ends of gear hub 19 and wheel hub 12 are interlocked by squared clutch teeth at 20 so that rotation of wheel 11 is imparted to gear 18. Gear casing 16 has an enlarged tubular extension 21 at the rear thereof, and detachably threaded on this extension is a reducer fitting 22 within which is disposed a bearing 23 having a longitudinal shaft 24 journaled therein. A bushing 25 is threaded in the rear end of reducer fitting 22 and engaged with suitable packing at 26 so as to prevent leakage of lubricant from the gear casing 17 about the shaft 24. Secured on the shaft 24 within the gear casing 17 is a pinion 27 meshing with bevel gear 18, and the forward end of shaft 24 is journaled in a bearing 28 fixed to and projecting rearwardly from tube 16. It is to be noted that the gear casing 17 is substantially oil tight, a suitable packing ring 29 being provided between the bevel gear 18 and the adjacent side of the casing 17 to prevent leakage of oil out of the latter around the hub of gear 18. The tubular extension 23 is of a size to permit rearward passage of the pinion 27 therethrough so that when the fitting 22 is detached from said extension 21, the shaft 23 with its pinion 27 may be removed.

The rear end of shaft 24 is fitted and secured within the forward end of a tubular shaft 30 whose rear end is journaled in a bearing sleeve 31 carried by the lower end of a vertical bracket 32. Associated with bearing 31 is a suitable fitting 33 to facilitate introduction of lubricant therein whereby free rotation of the rear end of the shaft 30 in said bearing 31 is promoted. Fixed at suitable intervals longitudinally of the shaft 30 and upon the latter is a series of tangentially extending spring teeth or fingers 34 arranged in spiral or auger fashion about the tubular shaft 30. These teeth or fingers preferably have their inner ends coiled about the shaft 30 and secured against turning thereon by cross pins, as at 35.

As shown clearly in Figures 2 to 4, inclusive, the bracket 32 is adjustable in length by making the same in sections adjustably slidably overlapped, as at 37. The upper end of this bracket has a vertical series of openings 38 to facilitate attachment thereof to a cross bar 39 connecting the rear ends of the beams 5 of the cultivator unit. By means of the series of openings 38, vertical adjustment of the rear end of shaft 30 may be effected. The end of axle 10 at the outer side of wheel hub 12 is carried by the lower end of a vertical bracket 40 which is vertically adjustable through a collar 41 on the inner end of a horizontal arm 42 fixed to and projecting inwardly from an adjacent beam 5. Thus, the whole attachment may be vertically adjusted relative to the ground so as to secure most efficient traction engagement of the spiked wheel with the ground and most effective operation of the spring fingers or teeth 34 between the plants of a row.

In operation, upon forward travel of the cultivator, the spike teeth of the wheel 11 engage the ground so that said wheel is caused to rotate and drive the shaft 30 through the gearing 18 and 27. As the shaft 30 rotates, the spring teeth or fingers 34 are caused to successively pass between the plants of the row, effectively stirring the soil around the plants, and removing clods and excess dirt from between the plants so as to uncover those plants which have been covered up in cultivating. The spring nature of the teeth or fingers 34 allows them to yield when striking relatively stationary objects or heavy clods. The drive wheel takes the place of what is known as a clod finder, and is made with curved spikes to let the fine dirt filter through to the small plants being cultivated.

From the foregoing description, it is believed that the construction and operation, as well as the advantages, of the present invention, will be readily understood and appreciated by those skilled in the art. It will be apparent that the attachment is very simple, compact and durable in construction, inexpensive to manufacture, easy to install, and efficient in operation. Minor changes in details of construction illustrated and described are contemplated, such as fairly fall within the spirit and scope of the invention as claimed.

What I claim as new is:

1. A plant-uncovering, dirt-stirring, and clod-removing attachment for straddle-row cultivators, comprising a longitudinal shaft having a longitudinal series of spring fingers projecting therefrom in spiral fashion, a ground-engaging spiked wheel operatively connected to the forward end of said shaft for continuously rotating the same, and means to mount the device upon the cultivator frame to occupy a position with the longitudinal shaft disposed directly above a row of plants being cultivated so that the spiked wheel will engage the ground and be rotated for driving the longitudinal shaft and causing the spring fingers of the latter to successively pass between plants of the row, a gear casing, a transverse axle carried by the gear casing and projecting therefrom, said spiked wheel being journaled on said axle, gearing in the gear casing operatively connecting said spiked wheel with said longitudinal shaft, and vertically adjustable brackets carried by the forward and rear ends of the attachment for regulating the height of the axle and longitudinal shaft relative to the ground.

2. A plant-uncovering, dirt-stirring, and clod-removing attachment for straddle-row cultivators, comprising a longitudinal shaft having a longitudinal series of spring fingers projecting therefrom in spiral fashion, a ground-engaging spiked wheel operatively connected to the forward end of said shaft for continuously rotating the same, and means to mount the device upon the cultivator frame to occupy a position with the longitudinal shaft disposed directly above a row of plants being cultivated so that the spiked wheel will engage the ground and be rotated for driving the longitudinal shaft and causing the spring fingers of the latter to successively pass between plants of the row, a gear casing, a transverse axle carried by the gear casing and projecting therefrom, said spiked wheel being journaled on said axle, gearing in the gear casing operatively connecting said spiked wheel to said longitudinal shaft, and vertically adjustable brackets carried by the forward and rear ends of the attachment for regulating the height of the axle and longitudinal shaft relative to the ground, said gearing including a pinion on the forward end of the longitudinal shaft, said gear casing having a removable rear member permitting rearward removal of the longitudinal shaft and its pinion from the gear casing.

WILLIAM OTT HANCOCK.